(12) United States Patent
Shire (10) Patent No.: US 12,524,226 B2
(45) Date of Patent: Jan. 13, 2026

(54) SYSTEM AND METHOD FOR HANDLING CONFIGURATION OF A VEHICLE

(71) Applicant: VOLVO TRUCK CORPORATION, Gothenburg (SE)

(72) Inventor: Joshua Shire, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 65 days.

(21) Appl. No.: 18/181,723

(22) Filed: Mar. 10, 2023

(65) Prior Publication Data

US 2023/0376294 A1    Nov. 23, 2023

(30) Foreign Application Priority Data

Mar. 7, 2022 (EP) ..................................... 22160558
May 18, 2022 (EP) ..................................... 22174022

(51) Int. Cl.
*G06F 8/71* (2018.01)
*G06F 8/61* (2018.01)

(52) U.S. Cl.
CPC . *G06F 8/71* (2013.01); *G06F 8/61* (2013.01)

(58) Field of Classification Search
CPC ... G06F 8/60; G06F 8/61; G06F 9/445; G06F 9/44505; H04W 4/40
USPC ................................................. 717/120–123
See application file for complete search history.

(56) References Cited

U.S. PATENT DOCUMENTS

| 2014/0047458 | A1* | 2/2014 | Li | H04L 67/34 |
| | | | | 719/315 |
| 2020/0320201 | A1* | 10/2020 | Robinson | G06F 21/64 |
| 2021/0150829 | A1* | 5/2021 | Lee | G06F 8/71 |
| 2021/0266295 | A1 | 8/2021 | Stroz | |
| 2021/0407220 | A1* | 12/2021 | Fang | H04L 67/125 |
| 2022/0343241 | A1* | 10/2022 | Jha | G08G 1/166 |

FOREIGN PATENT DOCUMENTS

| CN | 115408068 A | * | 11/2022 | |
| CN | 112698873 B | * | 8/2024 | G06F 9/4403 |

OTHER PUBLICATIONS

Extended European Search Report in corresponding European Application No. 22174022.8 dated Nov. 4, 2022 (10 pages).

(Continued)

*Primary Examiner* — Qing Chen
(74) *Attorney, Agent, or Firm* — Jeffri A. Kaminski; Venable LLP (57) ABSTRACT

A method is performed by a vehicle system for handling configuration of a vehicle. The vehicle system obtains a request for a service to be provided on-board the vehicle. The vehicle system compares a current configuration with a required configuration of network capabilities that the vehicle is required to have to be capable of hosting the service. The network capabilities comprise one or more containers and/or one or more logical networks connecting containers to one another and/or to one or more offboard resources. When a result of the comparing indicates that the current configuration is different than the required configuration, the vehicle system triggers the vehicle to reconfigure its current configuration of network capabilities such that the vehicle comprises the required configuration of the network capabilities and is thereby capable of hosting the service.

10 Claims, 5 Drawing Sheets

(56) References Cited

OTHER PUBLICATIONS

Hani Sami et al.; "Vehicular-OBUs-As-On-Demand-Fogs: Resource and Context Aware Deployment of Containerized Micro-Services"; IEEE/ACM Transactions on Networking; vol. 28; Issue 2; pp. 778-790; Mar. 2020; Project: Intelligent On-Demand Fog Formation, Service Placement, and Resource Scaling; DOI:10.1109/TNET.2020.2973800; 13 pages.

Extended European Search Report dated Aug. 9, 2022 in corresponding European Patent Application No. 22160558.7, 11 pages.

\* cited by examiner

SYSTEM AND METHOD FOR HANDLING CONFIGURATION OF A VEHICLE

TECHNICAL FIELD

The invention generally relates to a vehicle system and a method performed by the vehicle system. More particularly, the invention relates to handling configuration of a vehicle.

The invention can be applied in heavy-duty vehicles, such as trucks, buses, and construction equipment. Although the invention will be described with respect to a heavy-duty vehicle, the invention is not restricted to this particular vehicle, but may also be used in other vehicles such as trailers, wheel loaders, articulated haulers, excavators, backhoe loaders, passenger cars, marine vessels, working machines, etc. The term vehicle will be used herein when referring to any of the above types of vehicles.

BACKGROUND

Vehicles today comprises numerous applications, e.g. software applications. Services may be implemented, supported or delivered by software, e.g. an application, on-board the vehicle and provided by the vehicle manufacturer, the vehicle owner or a third-party. An example of an application may be a driver time management system, fleet management system, body builder equipment control, passenger media control, etc. Applications to support or deliver services may be installed and configured on-board the vehicle at manufacturing or at some later time instance. There is a constant need for further improvements related to such service in vehicles.

It is necessary for the vehicle to have a certain vehicle configuration to be able to enable the application. An application may or may not require a change or upgrade of the vehicle configuration. Sometimes, an application is installed on a vehicle even though the current vehicle configuration is not completely sufficient in order to enable the application, and this may lead to that the application does not function optimally. Some applications can be installed on-board and run on the vehicle without any change or upgrade of the vehicle configuration, i.e. the current vehicle configuration is sufficient for the application. For example, an application that requires direct internet access does not necessarily result in a change of the vehicle configuration, it only results in installation of the application. It is necessary to ensure that a vehicle is properly configured to host a desired application or service. Further improvements related to applications and vehicle configuration is necessary.

Different applications supporting, implementing or delivering services running on a vehicle may require communications to different remote, offboard end points. Often, this endpoint is located on the internet. Other times, these endpoints are located on private networks accessible by a private Access Point Name (APN) or a Virtual Private Network (VPN). This can cause routing challenges if the VPNs or APNs have conflicting Internet Protocol (IP) address spaces. Further, these services or their communications may have different quality, security or safety requirements. Therefore, solutions for how to configure the vehicle in a dynamic way, based upon services bought by the customer, which allows for conflicting IP routing or forwarding tables needs to be provided. It may also be necessary to ensure that communications are segregated and segmented at the logical link level for quality, safety and security. Other issues to consider may be how to support services delivered by applications which may not be designed specifically to run on automotive Electronic Control Units (ECU), and thus demand more traditional internet connectivity as one would expect from a consumer mobile device.

Therefore, there is a need to at least mitigate or solve this issue.

SUMMARY

An object of the invention is to improve handling configuration of a vehicle.

According to a first aspect of the method is performed by a vehicle system for handling configuration of a vehicle. The vehicle system obtains a request for a service to be provided on-board the vehicle. The vehicle system compares a current configuration of the vehicle's network capabilities with a required configuration of network capabilities that the vehicle is required to have to be capable of hosting the requested service. The network capabilities comprise one or more containers and/or one or more logical networks connecting containers to one another and/or to one or more offboard resources. The container is a logical structure representing a segmented part of the vehicle's operating system resources assigned to the service and that are separated from other operating system resources of the vehicle. When a result of the comparing indicates that the current configuration of the network capabilities is different than the required configuration of the network capabilities, the vehicle system triggers the vehicle to reconfigure its current configuration of network capabilities such that the vehicle comprises the required configuration of the network capabilities and is thereby capable of hosting the service. By the provision of the method, the handling of configuration of the vehicle is improved. Another advantage may be that it enables configuring of the vehicle in a dynamic way, based upon services, which allows for conflicting IP routing or forwarding tables, and ensures that communications are segregated and segmented at the logical link level for quality, safety and security.

According to one embodiment, the vehicle system may trigger the service to be provisioned on-board the vehicle. Hereby an improvement in that the service will be ready to be used after being provisioned on-board the vehicle.

According to a further embodiment, the vehicle system may perform the triggering of the service to be provisioned on-board the vehicle when the result of the comparing indicates that the current configuration of the network capabilities is the same or substantially the same as the required configuration of the network capabilities, or after the reconfiguration has been performed. Thus, the service may be provided to the vehicle only when it has the required configuration of the network capabilities which may be a requirement for the service to be used in the most optimal way. Hereby an improvement in that a scenario where the vehicle is not capable of enabling the service may not likely occur. An advantage may be that it may not be necessary to install and configure the vehicle considering any possible required networking capabilities, but a minimum or basic amount of networking capabilities may be installed and configured at vehicle manufacturing. Additional and other networking capabilities may be installed and configured at some later time and when necessary. An advantage of this may be that it provides flexibility to the vehicle system.

According to another embodiment, the reconfiguration of the current configuration of network capabilities may comprise one or more of:

installing one or more applications supporting the requested service; and/or granting one or more applications access to required network resources; and/or inflating one or more new containers; and/or configuring or reconfiguring existing containers; and/or creating one or more new logical networks by logically connecting containers to each other and/or to one or more offboard resources; and/or activating one or more network interfaces.

An advantage of this may be that the vehicle may comprise a configuration which maps with the requested service such that the service may function in an optimal fashion. Another advantage of this may be that it provides segregation of service communication. For example for a service that has security below an acceptable level and a potential for driver distraction if abused, the invention provides the possibility to create a logical network to support that service on its own. This has advantages of general safety, security and quality of service. Segregation of incompatible data flows, prioritization of certain data flows or down prioritization of others, protection of sensitive data flows or prevention of misuse or abuse may be other advantages.

According to a further embodiments, the vehicle system may compare the current configuration of the vehicle's network capabilities with a required configuration of network capabilities that the vehicle is required to have to be capable of hosting the requested service by comparing a state of one or more current containers that are currently present on the vehicle with a state of one or more required containers that are required to be present on the vehicle to be capable of hosting the requested service. An advantage of this may be that the reconfiguration of the current configuration of network capabilities maps with the required configuration as much as possible. Thus, it is possible for the service to be run on-board the vehicle in the most optimal way.

According to another embodiment, communication with the provisioned service may be based on one or more containers supporting the service. Using other words, the one or more containers supporting the service are used for the communication with the provisioned service. With the containers, the communication with the provisioned service may be isolated from at least one other form of communication by the vehicle. The container implements only those interfaces required by the service running in the container rather than running the entire operating system. This provides an advantage of reducing the risk for conflict between the service and other parts of the vehicle's operating system. Another advantage may be that the quality and speed of the service may be improved.

According to another embodiment, the service may require access to internet, to body builder equipment comprised in the vehicle or to a communication infrastructure comprised in the vehicle. An advantage of this may be that the method is appliable to a variety of services and it is therefore a flexible method.

According to a further embodiment, the vehicle system may be partly or completely located offboard the vehicle, or the vehicle system may be partly or completely located onboard the vehicle. An advantage of the vehicle system being partly located offboard the vehicle may be that the part that is located onboard the vehicle may function even when there is a communication link breakdown between the vehicle and the offboard location. An advantage of the vehicle system being completely located offboard the vehicle may be that it may be easy to perform maintenance, updating, diagnostics etc. without disturbing or affecting the vehicle. An advantage of the vehicle system being completely located onboard the vehicle may be that communication between the vehicle system and for example ECUs is short, which reduces the risk for signal delay.

According to a second aspect of the invention, the vehicle system is adapted to perform the method of the first aspect. Advantages and effects of the vehicle system of the second aspect are largely analogous to the advantages and effects of the method of the first aspect. Further, all embodiments of the method are applicable to and combinable with all embodiments of the vehicle system, and vice versa.

According to a third aspect of the invention, the vehicle comprises at least a part of the vehicle system.

According to a fourth aspect of the invention, the computer program comprises program code means for performing the steps of the method of the first aspect when the program is run on a computer.

According to a fifth aspect of the invention, the computer readable medium carries a computer program comprising program code means for performing the method of the first aspect when the program product is run on a computer.

According to a sixth aspect of the invention, the method is performed by a vehicle system for handling configuration of a vehicle. The vehicle system inflates one or more containers. A container is a logical structure representing a segmented part of the vehicle's operating system resources and that are separated from other operating system resources of the vehicle. The vehicle system initiates configuration of one or more ECU comprised in the vehicle to connect the one or more containers. By the provision of the method, the handling of configuration of the vehicle is improved. An advantage of using the container may be that it implements only those interfaces required by the service running in the container rather than running the entire operating system. Another advantage may be that the quality and speed for enabling the service on the vehicle may be improved.

According to a further embodiment, the vehicle system may initiate configuration of one or more logical networks to support the one or more containers. An advantage of configuration of one or more logical network may be that it enables the containers to function properly and in an improved fashion, and this further enables new services to be provided to the vehicle. An advantage of this may be that it provides segregation of service communication. For example for a service that has security below an acceptable level and a potential for driver distraction when abused, the invention provides the possibility to create a logical network to support that service on its own. This has advantages of general safety, security and quality of service. Segregation of incompatible data flows, prioritization of certain data flows or down prioritization of others, protection of sensitive data flows or prevention of misuse or abuse may be other advantages.

According to another embodiment, the one or more logical networks may support a service on-board the vehicle. An advantage of this may be that it is possible for the service to be run on-board the vehicle in the most optimal way.

According to another embodiment, the segmented part of the vehicle's operating system resources that the container represents may be assigned to a service on-board the vehicle. An advantage of this may be that it is possible for the service to be run on-board the vehicle in the most optimal way.

According to a further embodiment, inflating of the one or more containers may be adapted to vehicle hardware, vehicle software, vehicle operating region and vehicle product class. An advantage of this may be that the container may be tailormade to the particular service and on the particular vehicle. Thus, the container may only comprise the necessary functions for the particular vehicle hardware, vehicle software, vehicle operating region and vehicle product class, and not necessarily any unnecessary functions that are not used for any of them.

According to a further embodiment, the container may be associated with communication related to a service on-board the vehicle. An advantage of this may be that the communication with a particular service may be isolated from communication with other services. An advantage of this may be that it provides segregation of service communication. For example for a service that has security below an acceptable level and a potential for driver distraction when abused, the invention provides the possibility to create a logical network to support that service on its own. This has advantages of general safety, security and quality of service. Segregation of incompatible data flows, prioritization of certain data flows or down prioritization of others, protection of sensitive data flows or prevention of misuse or abuse may be other advantages.

According to another embodiment, the container may be implemented using Linux namespaces. An advantage of using a Linux namespace may be that is adaptable to a several or any type of service that is requested to be provided on the vehicle. Linux namespaces are easy to implement and may be tailormade to a particular service, when necessary.

According to yet another embodiment, the vehicle system may be partly or completely located offboard the vehicle. An advantage of the vehicle system being partly located offboard the vehicle may be that the part that is located onboard the vehicle may function even when there is a communication link breakdown between the vehicle and the offboard location. An advantage of the vehicle system being completely located offboard the vehicle may be that it may be easy to perform maintenance, updating, diagnostics etc. without disturbing or affecting the vehicle.

According to a seventh aspect of the invention, the vehicle system is adapted to perform the method of the sixth aspect. Advantages and effects of the vehicle system of the seventh aspect are largely analogous to the advantages and effects of the method of the sixth aspect. Further, all embodiments of the method are applicable to and combinable with all embodiments of the vehicle system, and vice versa.

According to an eight aspect of the invention, the vehicle comprises at least a part of the vehicle system.

According to a ninth aspect of the invention, the computer program comprises program code means for performing the steps of the method of the sixth aspect when the program is run on a computer.

According to a tenth aspect of the invention, the computer readable medium carries a computer program comprising program code means for performing the method of the sixth aspect when the program product is run on a computer.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

The drawings are not necessarily to scale, and the dimensions of certain features may have been exaggerated for the sake of clarity. Emphasis is instead placed upon illustrating the principle of the embodiments herein.

DETAILED DESCRIPTION OF EXAMPLE EMBODIMENTS OF THE INVENTION

Figure 1:
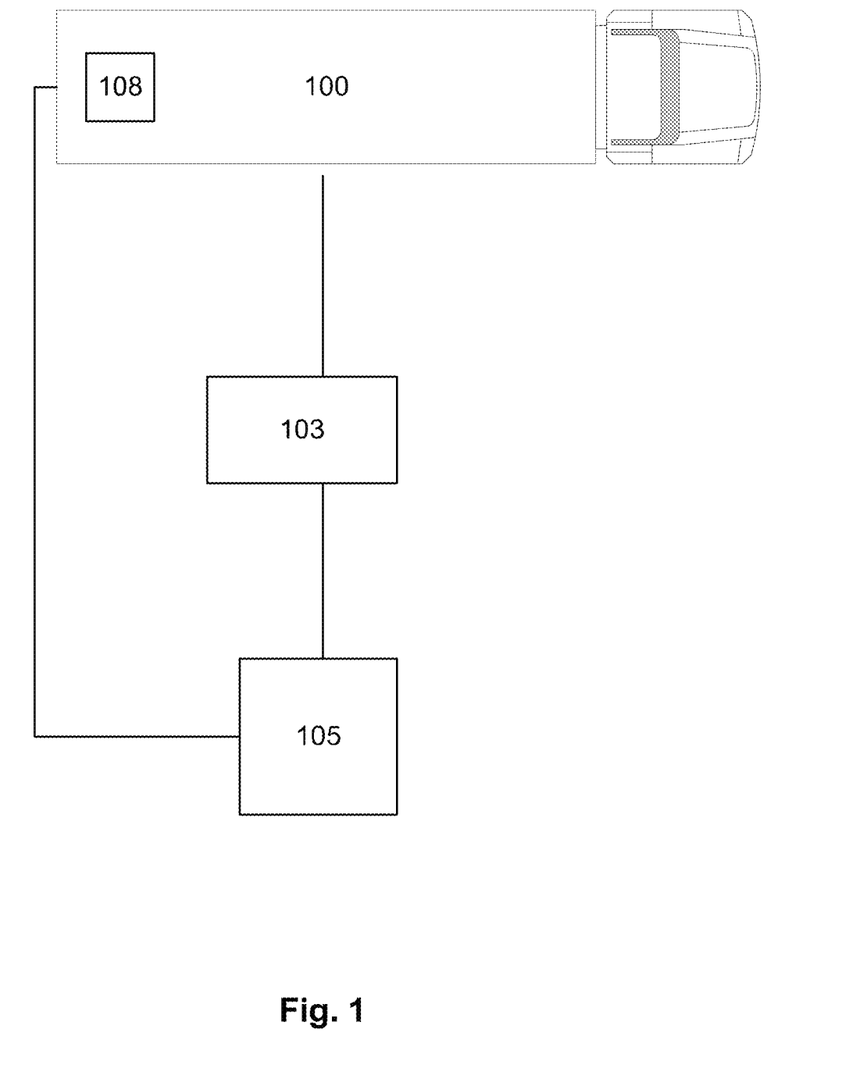
FIG. 1 is a schematic drawing illustrating a system.

FIG. 1 is a schematic drawing illustrating a system. The system comprises a vehicle 100. The vehicle 100 may be a heavy-duty vehicle such as for example a truck, buss, construction equipment. The vehicle 100 may also be other vehicles such as trailers, wheel loaders, articulated haulers, excavators, backhoe loaders, passenger cars, marine vessels, working machines, etc. For the sake of simplicity, the term vehicle will be used herein when referring to any of the above examples of vehicles.

The vehicle 100 comprises one or more services, e.g. in the form of software such as an application. The services on-board the vehicle 100 may be fixed or dynamic, new services may be added to the vehicle 100, existing services may be removed from the vehicle 100, existing services on-board the vehicle 100 may be changed etc. Services may be installed and configured on-board the vehicle 100 at manufacturing or at some later time instance. The software, e.g. application, supporting, implementing, or delivering the service may or may not be seen by the user of the vehicle 100, e.g. the driver. An example of an application may be a driver time management system, fleet management system, body builder equipment control, passenger media control, etc.

FIG. 1 illustrates a vehicle database 103 arranged to store vehicle data, vehicle configuration data or vehicle configuration information. The vehicle database 103 is arranged to comprise existing or current vehicle configuration. The vehicle database 103 may comprise information indicating which configuration items that are necessary for networking capabilities required by various services which are currently not comprised or enabled in the vehicle 100. The vehicle database 103 may be a local database on-board the vehicle 100, a cloud database or some other remotely located database accessible by the vehicle 100. A first part of the vehicle database 103 may be comprised in the vehicle 100 and a second part of the vehicle database 103 may be located at a remote distance from the vehicle 100. The vehicle database 103 is arranged to be accessible by the vehicle 100. For example, the vehicle 100 may provide its current vehicle configuration data to the vehicle database 103. The vehicle database 103 may be a vehicle configuration database.

FIG. 1 illustrates a vehicle system 105. The vehicle system 105 may be arranged to access the vehicle database 103, e.g. to provide and obtain vehicle configuration data to and/or from the vehicle configuration database 103. The vehicle system 105 may be arranged to manage services for the vehicle 100 for example by obtaining requests for new services, changed services etc. that may be requested by for example a user, by a central service, by a vehicle fleet manager etc. The vehicle system 105 may be a cloud vehicle system. The vehicle system 105 may comprises a service management portal through which a user may request the service on the vehicle 100. The vehicle system 105 may be a remote vehicle system.

The vehicle 100 and the vehicle system 105 are adapted to be connected to each other via a wired and/or wireless connection. The connection may be completely wired, or the connection may be completely wireless, or a first part of the connection may be wired, and a second part of the connection may be wireless. For example there may be a wired connection from the vehicle system 105 to an intermediate unit, e.g. a gateway, a hub etc., and there may be a wireless connection from the intermediate unit to the vehicle 100. The vehicle system 105 may be connected directly to the vehicle 100. The vehicle system 105 may be connected to the vehicle database 103 and the vehicle database 103 may be connected to the vehicle 100, i.e. the vehicle system 105 may be connected to the vehicle 100 via the vehicle database 103. The connections between the vehicle system 105 and the vehicle database 103 may be wired and/or wireless. The connection may be completely wired, or the connection may be completely wireless, or a first part of the connection may be wired, and a second part of the connection may be wireless. For example there may be a wired connection from the vehicle system 105 to an intermediate unit, e.g. a gateway, a hub etc., and there may be a wireless connection from the intermediate unit to the vehicle database 103.

The vehicle system 105 may be located partly onboard and partly offboard the vehicle, or completely offboard the vehicle 100, or completely onboard the vehicle 100. Offboard refers to being arranged remotely from the vehicle 100, e.g. at a different location than the vehicle 100, at a distance from the vehicle 100. When the vehicle system 105 is located partly onboard and partly offboard the vehicle 100, then for example a first part of the vehicle system 105 may be comprised in the vehicle 100 and a second part of the vehicle system 105 may be remotely located from the vehicle 100. The vehicle system 105 may be a remote service management system or it may comprise at least a part of a remote service management system. The vehicle system 105 may comprise one or more subsystems, e.g. a service management system, an application and service portal system through which a user may request the service on the vehicle 100, etc.

The vehicle 100 comprises one or more ECUs 108. Only one ECU 108 is illustrated in FIG. 1 for the sake of simplicity. ECU 108 is short for electronic control unit and may also be known as an electronic control module. The ECU 108 is arranged to control a specific function, e.g. an electronic function, in the vehicle 100 such as an electrical engine, an airbag, seat heating, infotainment system, brake control, etc. The ECU 108 and the vehicle system 105 may be arranged to be connected to each other via wired and/or wireless connection. The connection may be completely wired, or the connection may be completely wireless, or a first part of the connection may be wired, and a second part of the connection may be wireless. For example there may be a wired connection from the vehicle system 105 to an intermediate unit, e.g. a gateway, a hub etc., and there may be a wireless connection from the intermediate unit to the ECU 108. The ECU 108 may be arranged to be configured, upon request from the vehicle system 105. The ECU 108 may be arranged to function as an on-board vehicle computer. The vehicle 100 comprises multiple ECUs 108. The ECU 108 comprises both hardware and software. The ECU may represent or comprise an operating system instance, e.g. an instance of the vehicle's operating system.

Figure 2:
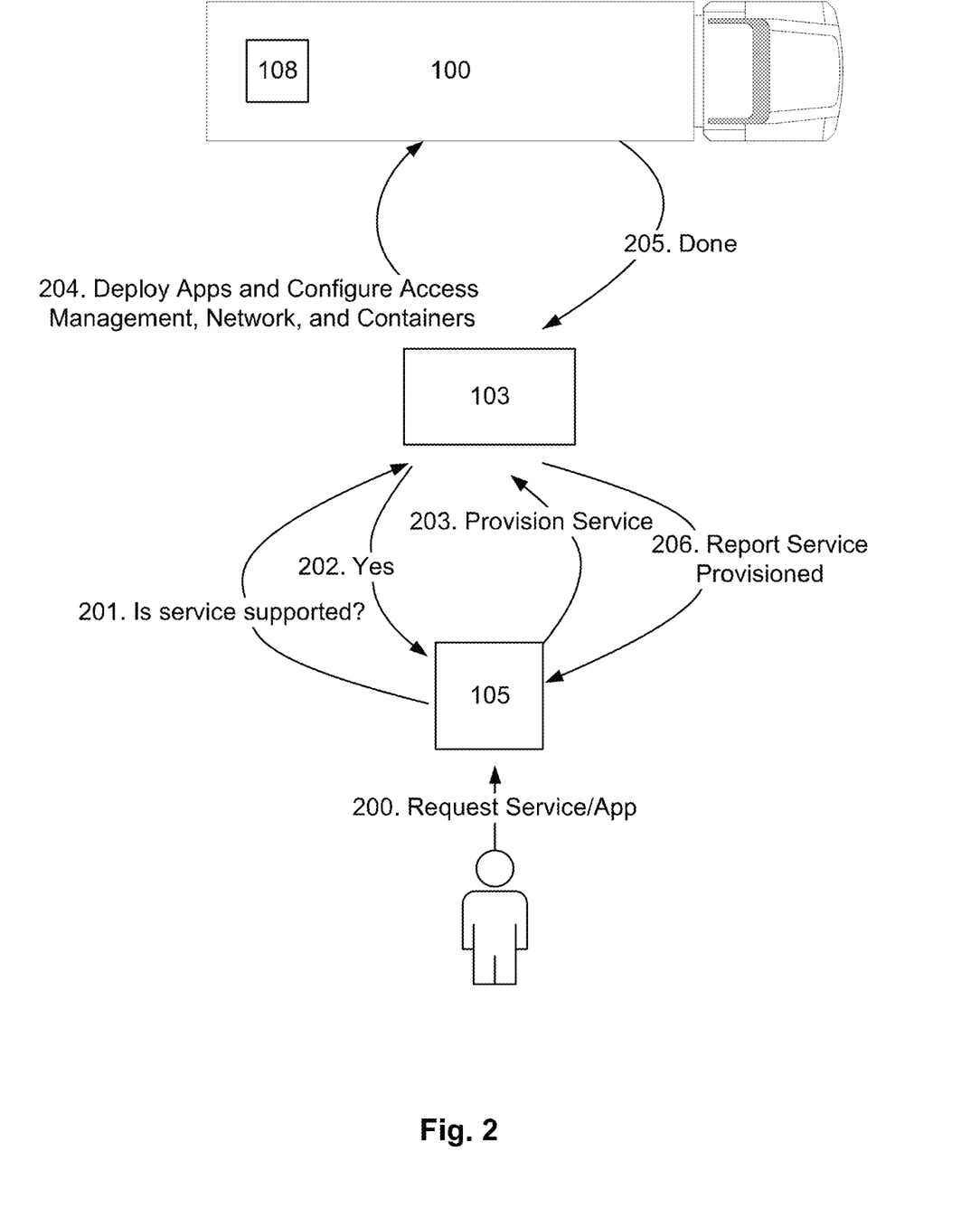
FIG. 2 is a schematic drawing illustrating a system.

FIG. 2 is a flow chart illustrating a method for configuration the vehicle 100. This is to ensure that vehicle 100 is properly configured to host a desired application or service.

Step 200

The owner, operator or user of the vehicle 100 and/or of the vehicle system 105 may initiate a request for a service to be provisioned on the vehicle 100, i.e. the service is provided to the vehicle 100 upon demand. Using other words, the vehicle system 105 may receive a request to provide a service on the vehicle 100. The service may be a new service, an upgrade of an existing service etc. The service may be implemented, supported or delivered by software, e.g. an application. For example, the vehicle system 105 may comprise an application and service portal system with a display unit on which a list of available services may be displayed. The service may be delivered via an application to the vehicle 100. The application may exist and require configuration or may need to be pushed down and installed onboard the vehicle 100. The owner, operator or user may select one or more of the services that he wants the vehicle 100 to have.

The service may be provided by the vehicle manufacturer, the vehicle owner or a third-party. The applications to support or deliver the service may be provided to the vehicle 100 at manufacturing or at some later time instance during the vehicle lifetime.

An example of an application may be a driver time management system, fleet management system, body builder equipment control, passenger media control, etc.

The request may comprise information indicating which networking capabilities the service needs. For example, the service may need access to internet.

The service may be designed to run specifically on an ECU 108 comprised in the vehicle, or it may be designed to run on for example a consumer mobile device, i.e. not designed specifically to be run on a vehicle ECU 108. Services designed to run on a consumer mobile device and not specifically on an ECU 108 may require more traditional internet connectivity compared to what a vehicle 100 is currently capable of providing.

For example, a user, e.g. a vehicle fleet manager, having access to the vehicle system 105 provides a request for the service. The service may be a new service, an upgrade of an existing service etc. The vehicle system 105 may comprise or may be connected to a service marketplace or a service management portal through which the user may request a particular service.

Steps 201-202

As a result of the received request, the vehicle system 105 may realize that the vehicle 100 needs to comprise a specific networking capability to support the service, e.g. from the information in the request received in step 201. The vehicle system 105 determines if the vehicle's current configuration of network capabilities is sufficient for supporting the requested service. The vehicle system 105 may also determine which required networking capabilities that are required by the vehicle 100 to support the service.

This may be done by the vehicle system 105 sending a request to the vehicle database 103 to check if the requested service is supported by the vehicle's current configuration of network capabilities. The vehicle database 103 may map or compare the current configuration of network capabilities with the required configuration of network capabilities that is required by the requested services, for example in terms of vehicle hardware, existing software and software configuration, operating region etc. In the example in FIG. 2, the vehicle database 103 replies with "yes", i.e. the current configuration of network capabilities supports the requested service, i.e. no reconfiguration of the network capabilities are necessary. The result of the comparison may indicate that there is a gap between the required networking capabilities and the existing networking capabilities, or the result may indicate that there is no gap, i.e. that the vehicle 100 comprises sufficient networking capabilities to support the service.

For example, when the request comprises information indicating that the service needs internet, then the communication system 103, based on information obtained from the database, may determine that configuration items a, b, c and d needs to be set. However, the existing networking capabilities of the vehicle 100 does not have configuration item d.

Instead of what is described above, the vehicle system 105 may send a request for the information indicating the current configuration of network capabilities to the vehicle database 103. The vehicle database 103 replies with the requested information. The vehicle system 105 may compare the current configuration of network capabilities with the required configuration of network capabilities that is required by the requested services. Information indicating the required configuration of network capabilities may then be comprised for example in the request in step 200 or obtained from the vehicle configuration database 103. As a result of the comparison, the vehicle system 105 may determine that the requested service is supported by the vehicle's current configuration of network capabilities.

The network capabilities comprise one or more containers and/or one or more logical networks connecting containers to one another and/or to one or more offboard resources. The container is a logical structure representing a segmented part of the vehicle's 100 operating system resources assigned to the service and that are separated from other operating system resources of the vehicle 100. The networking capabilities may be for example the vehicle's capability to access internet, connection between the application and an accessory Ethernet network, a connection between the application and it's private APN, a connection for the application to its own APN, a connection between the application and a Wi-Fi Service Set Identifier (SSID) etc., it may be associated with vehicle hardware, existing software and software configuration, operating region etc.

The comparison may comprise to compare a state of one or more current containers that are currently present on the vehicle 100 with a state of one or more required containers that are required to be present on the vehicle 100 to be capable of hosting the requested.

The state may indicate whether the necessary containers exist, whether they are configured properly, etc.

The service may request or need to be granted access to certain networks. For example, when the request in step 200 comprises information indicating that the service needs internet, then the vehicle system 105, based on information obtained from the vehicle database 103, may determine that configuration items a, b, c and d needs to be set. However, the existing networking capabilities of the vehicle 100 does not have configuration item d.

As mentioned above, the example in FIG. 2 illustrates that the requested service is supported by the current configuration of network capabilities. Another example (not illustrated in FIG. 2) may be that the requested service is not supported by the current configuration of network capabilities. When the service is not supported, then the vehicle system 105 may trigger the vehicle 100 to reconfigure its current configuration of network capabilities such that the vehicle 100 comprises the required configuration of the network capabilities and is thereby capable of hosting the service. Information indicating the required configuration of network capabilities may be provided together with the trigger or the vehicle 100 may obtain the necessary configuration data from the vehicle database 103. The reconfiguration of the network capabilities may comprise one or more of:

installing one or more applications supporting the requested service; and/or
granting one or more applications access to required network resources; and/or
inflating one or more new containers; and/or
configuring or reconfiguring existing containers; and/or
creating one or more new logical networks by logically connecting containers to each other and/or to one or more offboard resources; and/or
activating one or more network interfaces, e.g. VLAN interfaces.

Logically connecting may be described as creating new logical networks at the link level to isolate data flows from others already on the vehicle 100.

Inflating, configuration and reconfiguration of containers and creating logical networks will be described in more detail later.

Step 203

When the vehicle 100 has the required configuration of network capabilities in order to support the service, the vehicle system 105 may send a request for provisioning of the service on-board the vehicle 100 to the vehicle database 103.

Step 204

When the vehicle database 103 has received the request in step 203, it may deploy applications and configure access management, network and containers to the vehicle 100. Using other words, the vehicle database 103 may send to the vehicle 100, information indicating that it should install an application that may implement, support or deliver the requested service. The vehicle database 103 may provide access management information, network information, container information etc. that the vehicle 100 needs in order to install the application. The ECU 108 or a control unit (not shown in FIG. 2), or any other suitable unit comprised in the vehicle 100 may receive the information from the vehicle database 103. The provisioning may be performed by the vehicle 100 configuring a container based on data received from the vehicle database 103, when it already does not exist.

A container may be described as a software, a computer program, a computing unit etc. It may be described as an isolated process that are isolated from other processes but still running on the same kernel. With a container, an individual application may be segregated from a host operating system's other process. Rather than running an entire operating system as in a Virtual Machine (VM), a container implements only those interfaces required by the application running in the container. The container may be implemented using a Linux namespace. The container provides a logical structure configured to isolate for example communication related to the requested service from at least one other form of communication by the vehicle 100, towards the networking capabilities or network segmentations of containers at a logical link layer in relation to external communications.

In the case the application needs internet access, communication to and from the application may be directed to a specific logical interface connected to a segregated network. The network comprises a container running a networking stack connected to an Ethernet virtual LAN which is connected to a container running in the vehicle 100, e.g. an ECU 108, with a direct connection to the internet.

Steps 203 and 204 may be combined into one step, where the vehicle system 105 may send the request for provisioning of the service directly to the vehicle 100, not necessarily going via the vehicle database 103.

After steps 203 and 204 has been performed, the requested service is provisioned on-board the vehicle 100, e.g. in an ECU 108.

Step 205

The vehicle 100 may send a confirmation of that the service has been successfully provisioned on-board the vehicle 100. The confirmation may be sent to the vehicle database 103.

Step 206

The vehicle database 103 may send a report of the successfully provisioned service to the vehicle system 105. The report may be the confirmation, or the report may comprise the confirmation from step 205.

Steps 205 and 206 may be combined into one step where the vehicle 100 sends the confirmation of that the service has been successfully provisioned on-board the vehicle 100 directly to the vehicle system 105, not necessarily going via the vehicle database 103.

As mentioned earlier, the vehicle database 103 may partly or completely be comprised in the vehicle 100, and then the steps performed by the vehicle database 103 may be seen as being performed by the vehicle 100.

As also mentioned earlier, the vehicle database 103 may partly or completely be comprised in the vehicle system 105, and then the steps performed by the vehicle database 103 may be seen as being performed by the vehicle system 105.

Inflating, configuration and reconfiguration of containers and creating logical networks will now be described in more detail later. As mentioned above, when there is a gap between the exiting networking capabilities of the vehicle 100 and the required networking capabilities of the requested service, that gap may be addressed, e.g. by reconfiguring the networking capabilities in the vehicle 100. The reconfiguration of the current configuration of network capabilities comprises one or more of:

- installing one or more applications supporting the requested service; and/or
- granting one or more applications access to required network resources; and/or
- inflating one or more new containers; and/or
- configuring or reconfiguring existing containers; and/or
- creating one or more new logical networks by logically connecting containers to each other and/or to one or more offboard resources; and/or
- activating one or more network interfaces, e.g. VLAN interfaces.

Logically connecting may be described as creating new logical networks at the link level to isolate data flows from others already on the vehicle 100.

A container is a logical structure representing a segmented part of the vehicle's 100 operating system resources assigned to the service and that are separated from other operating system resources of the vehicle 100. For example, when the operating system resource is associated with communication, then the 301 may be described as a logical structure configured to isolate communication related to the service from other communication to and/or from the vehicle 100. Communication isolation is one example use of the container. In general, the container may segment operating systems resources, which may comprise memory, storage, processing, etc. A container enables an individual application to be segregated from a host operating system's other process. Rather than running an entire operating system as in a VM, a container implements only those interfaces required by the application running in the container.

Inflating of one or more containers may be adapted to vehicle hardware, vehicle software, vehicle operating region and vehicle product class. Different vehicles 100 may have different network architectures, e.g. different IP and VLAN. The container may therefore need to be configured to support that particular vehicle 100. There may be a dynamic component where the precise configuration of the container may also be dependent upon the other already configured containers, and of course the service it shall support.

A container may be described as a software, a computer program, a computing unit etc. It may be described as an isolated process that are isolated from other processes but still running on the same kernel. With a container, an individual application may be segregated from a host operating system's other process. Rather than running an entire operating system as in a Virtual Machine (VM), a container implements only those interfaces required by the application running in the container. The container provides a logical structure configured to isolate communication related to the requested service from at least one other form of communication by the vehicle 100, towards the networking capabilities or network segmentations of containers at a logical link layer in relation to external communications.

Containers may be implemented using namespaces, e.g. Linux namespaces. Namespaces are a Linux Kernel feature which provides for segregation of various kernel resources, e.g. memory, sockets, network interfaces, etc. When a network namespace exists on a Linux machine, an application running within that namespace, or container, will not see the same network stack as an application running outside of it. The application will see its own routing and forwarding tables, netfilter tables, socket list, etc. A namespace may be described as a named region in which the container runs, and which separates the container from other containers and the host operating system. A docker container is another example of an implementation of application containerization which uses Linux Kernel namespaces to achieve segregation.

There may be one or more containers in one namespace. When there are multiple containers 301 in one namespace, then they are arranged to access each other as they were on the same host operating system. Containers in different namespaces are separated from each other as they were on different host operating systems.

Multiple types of namespaces can be combined together to achieve a desired level of segregation.

The container may be a logical structure at a data link layer of an Open Systems Interconnection Model (OSI). A plurality of containers may interact over a logical network fabric. It is not necessarily a single container on a single computing unit, e.g. the ECU 108 or a virtual operating system running on a host, that is configured, but multiple containers across computing units may be connected by a logical network segment setup for this purpose. The container is arranged to deliver a service across a fabric of heterogenous hardware and software.

The service may require one or more containers. For example, some services require container x, some services require container y, and all can be running at the same time when multiple services at configured at the same time. Containers may be shared or exclusive to a single container.

Inflating of the one or more containers may comprise one or more of the following steps performed by the vehicle system 105:
   a) Initializing, logically segmenting and assigning, or migrating additional Local Area Network (LAN), Wide Area Network (WAN) or Personal Area Network (PAN) links, e.g. LTE APN or Sat., to the container 301, for example by specifying and attaching to additional APN contexts on a single Long Term Evolution (LTE) Network Access Device and assigning the resulting layer 3 WAN interface to the container, initializing a new BLE GAP state machine, a Generic Attribute Profile (GATT) server etc. BLE is short for Bluetooth Low Energy and GAP is short for Generic Access Profile.
   b) Initializing, segmenting, or migrating local area network links such as initializing a new 802.1Q Virtual Local Area Network (VLAN) Ethernet sub-interface, which can segment one physical Ethernet link into multiple logical links, and assigning it to the inflated container 301.
   c) Applying firewall configurations to the new namespace, such as netfilter rules to restrict the flow or data in to processing or applications running in the container, out from processing running in the container or through the new container.
   d) Applying routing and forwarding table configurations to the link and network layer within the namespace.
   e) Installing, configuring and initializing any applications required to support the service in the new namespace, such as a Domain Name System (DNS) forwarder.
   f) Connecting to certain WiFi SSIDs and creating a connection onboard between an application and this WiFi network.

Figure 3:
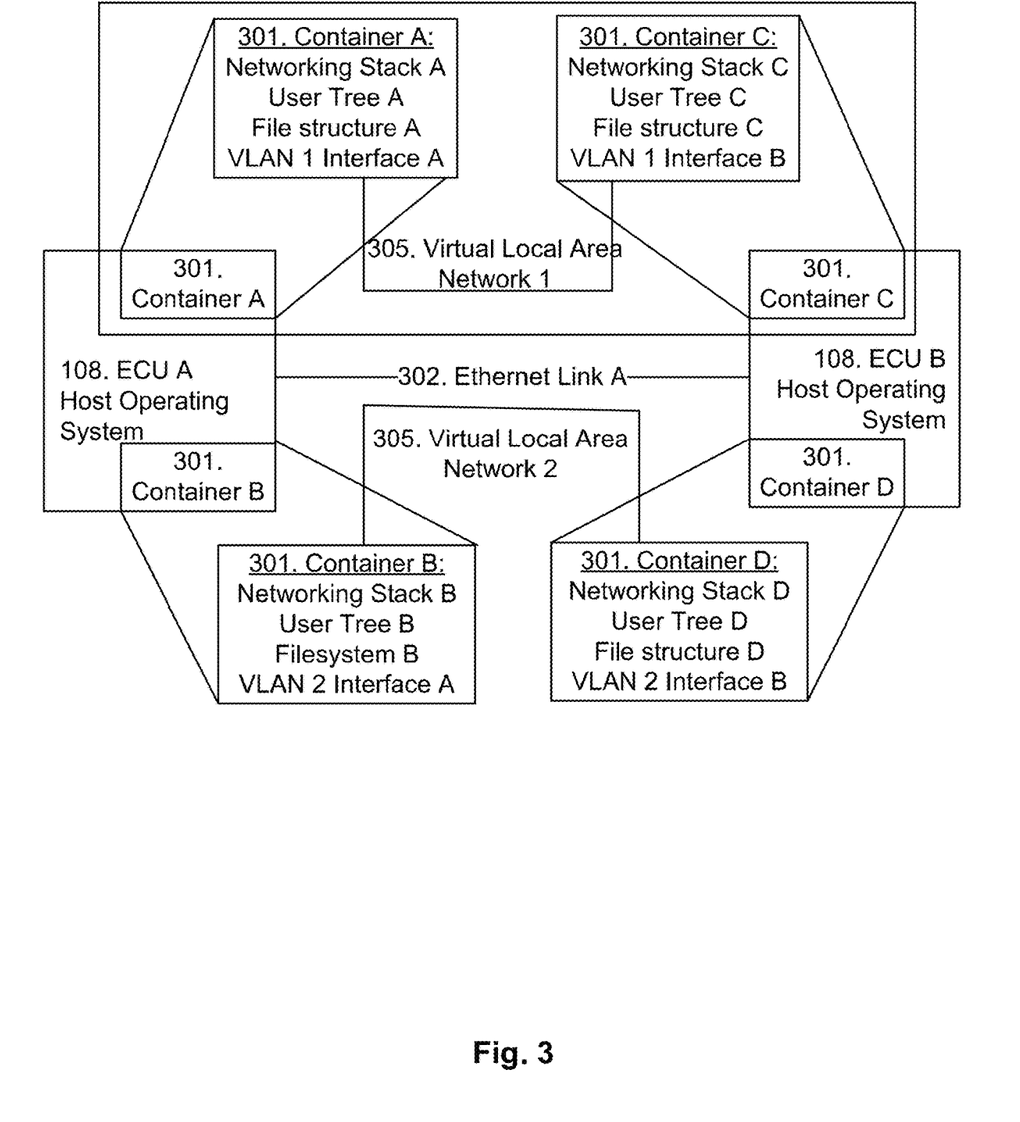
FIG. 3 is a schematic drawing illustrating a container.

FIG. 3 is a schematic drawing illustrating a container 301 in more detail. FIG. 3 shows an example with two ECUs 108, i.e. ECU A and ECU B. Each of the ECUs 108 has a host operating system. ECU A and ECU B are connected via an Ethernet link A 302. In the example in FIG. 3, four containers 301 are inflated, i.e. container A and container B connected to ECU A 108 and container C and container D connected to ECU B 108. Each container has for example its own networking stack, user tree, file structure and VLAN interface. Containers 301 for each ECU 108 are connected via a virtual local area network 305. Container A for ECU A and container C for ECU B are connected via the virtual local area network 1. Container B for ECU A and container D for ECU B are connected via the virtual local area network 2. Note that the number of containers 301, ECUs 108 etc. seen in FIG. 3 are only an example and that any other suitable number of entities may be applicable.

Considering an example with a file structure that that lives on persistent storage. For each container 301a new root may be created (\from the perspective of the applications within the container 301, but from the host it looks like \container2, \container2 and so on. So the host storage is further segmented.

For the example with the user tree, each container 301 has its own UID tree, so there may be a UID 1001 in each container 301, but they are logically different users, and the scope of that user is that container 301 only.

For the example with network resources, the root namespace or the host may have a routing table that for example says default route should go to 192.168.0.1. A container 301 on that host that have its own routing table with a conflicting route, so it could say default goes to 192.168.0.2.

Another example may be firewall rules where the host may deny everything, whereas a container 301 may allow all forwarding.

But unlike virtualization where it may also be possible do these things, the present invention is not running a separate instance of the Linux (for example) kernel for each container 301. Instead, the present invention creates a logical subdivision, i.e. the container 301, of the existing kernel instance which is more efficient compared to virtualization.

Figure 4:
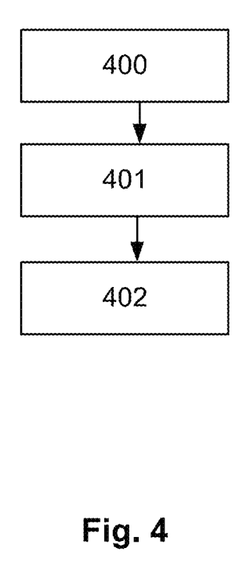
FIG. 4 is a flow chart illustrating a method.

The method described above will now be described seen from the perspective of the vehicle system 105. FIG. 4 is a flow chart illustrating a method performed by the vehicle system 105 for handling configuration of the vehicle 100. The vehicle system partly or completely located offboard the vehicle 100. For example, a first part of the vehicle system may be comprised offboard the vehicle 100 and a second part of the vehicle system may be comprised onboard the vehicle 100, or the vehicle system may be completely located offboard the vehicle 100. The vehicle system 105 may be partly or completely located on-board the vehicle. For example, a first part of the vehicle system may be comprised on-board the vehicle 100 and a second part of the vehicle system may be comprised offboard the vehicle 100, or the vehicle system may be completely located onboard the vehicle 100. The method comprises at least one of the following steps, which steps may be performed in any suitable order than described below:

Step 400

This step corresponds to step 200 in FIG. 2. The vehicle system 105 obtains a request for the service to be provided on-board the vehicle 100. The request may be inputted to the vehicle system 105 by a user, an operator, an owner etc. of the vehicle 100, a computer unit etc.

The request may comprise information indicating the required configuration of the network capabilities that is required to host the requested service.

The service may require access to internet, to body builder equipment comprised in the vehicle 100 or to a communication infrastructure comprised in the vehicle 100.

Communication with the service provisioned on-board the vehicle 100 may be based on the one or more containers supporting the service. Using other words, the one or more containers supporting the service are used for the communication with the provisioned service. With the containers, the communication with the provisioned service may be isolated from at least one other form of communication by the vehicle. The container implements only those interfaces required by the service running in the container rather than running the entire operating system. With this, the risk for conflict between the service and other parts of the vehicle's operating system may be reduced. Also, the quality and speed of the service may be improved with the user of the container(s).

Step 401

This step corresponds to steps 201 and 202 in FIG. 2. As a result of the received request, the vehicle system 105 may realize that the vehicle 100 needs to comprise a specific networking capability to support the service, e.g. from the information in the request received in step 201. The vehicle system 105 therefore compares a current configuration of the vehicle's network capabilities with a required configuration of the network capabilities that the vehicle 100 is required to have to be capable of hosting the requested service.

The network capabilities comprise one or more containers 301 and/or one or more logical networks connecting containers 301 to one another and/or to one or more offboard resources. An offboard resource may be for example an internet accessible server, a nomadic device on Bluetooth, etc. The container 301 is a logical structure representing a segmented part of the vehicle's 100 operating system resources assigned to the service and that are separated from other operating system resources of the vehicle 100.

The current configuration network capabilities may be obtained by the vehicle system 105 from the vehicle database 103 after the request in step 400 has been obtained or at some time instance before receiving the request. The required configuration of the network capabilities that is required to host the requested service may be comprised in the request from step 400, or the required configuration of the network capabilities may be obtained from the vehicle database 103. The vehicle database 103 may be a local database onboard the vehicle 100, a cloud database or some other remotely located database accessible by the vehicle system 105.

In step 401, the vehicle system 105 may map or compare the required networking capabilities with the existing networking capabilities of the vehicle 100, for example in terms of vehicle hardware, existing software and software configuration, operating region etc. The result of the comparison may indicate that there is a gap between the required networking capabilities and the existing networking capabilities, or the result may indicate that there is no gap, i.e. that the vehicle 100 comprises sufficient networking capabilities to support the service.

For example, when the request comprises information indicating that the service needs internet, then the vehicle system 105, based on information obtained from the vehicle database 103, may determine that configuration items a, b, c and d needs to be set. However, the existing networking capabilities of the vehicle 100 does not have configuration item d.

The networking capabilities may be for example the vehicle's capability to access internet, connection between the application and an accessory Ethernet network, a connection between the application and it's private APN, a connection for the application to its own APN, a connection between the application and a Wi-Fi Service Set Identifier (SSID) etc., it may be associated with vehicle hardware, existing software and software configuration, operating region etc.

Step 401 may comprise that the vehicle system 105 compares a state of one or more current containers 301 that are currently present on the vehicle 100 with a state of one or more required containers that are required to be present on the vehicle 100 to be capable of hosting the requested service.

Step 402

When a result of the comparing in step 401 indicates that the current configuration of the network capabilities is different than the required configuration of the network capabilities, the vehicle system 105 triggers the vehicle 100 to reconfigure its current configuration of network capabilities such that the vehicle 100 comprises the required configuration of the network capabilities and is thereby capable of hosting the service.

Reconfiguration of the current configuration of network capabilities may comprise one or more of:
  installing one or more applications supporting the requested service; and/or
  granting one or more applications access to required network resources; and/or
  inflating one or more new containers 301; and/or
  configuring or reconfiguring existing containers 301; and/or
  creating one or more new logical networks by logically connecting containers 301 to each other and/or to one or more offboard resources; and/or
  activating one or more network interfaces, e.g. VLAN interfaces.

Logically connecting may be described as creating new logical networks at the link level to isolate data flows from others already on the vehicle 100.

Inflating containers 301 and creating logical networks will be described in more detail with reference to FIG. 5 later.

The container 301 is a logical structure representing a segmented part of the vehicle's 100 operating system resources assigned to the service and that are separated from other operating system resources of the vehicle 100. A container 301 may be described as a software, a computer program, a computing unit etc. It may be described as an isolated process that are isolated from other processes but still running on the same kernel. With a container 301, an individual application may be segregated from a host operating system's other process. Rather than running an entire operating system as in a Virtual Machine (VM), a container implements only those interfaces required by the application running in the container. The container 301 may be implemented using a Linux namespace. The container 301 provides a logical structure configured to isolate communication related to the requested service from at least one other form of communication by the vehicle 100, towards the networking capabilities or network segmentations of containers 301 at a logical link layer in relation to external communications.

The configuration of the network capabilities may comprise a state of one or more containers 301 supporting the service. The state may indicate whether the necessary containers 301 exist, whether they are configured properly, etc. The segmented part of the vehicle's 100 operating system resources may be associated with communication related to the service.

For example, when the requested service is a service designed to run on a consumer mobile device and is not specifically designed for the vehicle ECU 108 which requires more traditional internet connectivity compared to what a vehicle 100 is currently capable of providing, then the vehicle system 105 may initiate at least one of installing and configuration of the required networking capabilities in the vehicle 100 to map with the traditional internet connectivity required by the service.

As mentioned above, reconfiguration of the network capabilities may comprise to inflate one or more new containers 301 adapted to the required networking capabilities, to configure existing containers 301 or to logically connect containers 301. A container 301 is a logical structure representing a segmented part of the vehicle's 100 operating system resources assigned to the service and that are separated from other operating system resources of the vehicle 100. For example, when the operating system resource is associated with communication, then the container 301 may be described as a logical structure configured to isolate communication related to the service from other communication to and/or from the vehicle 100. Communication isolation is one example use of the container. In general, the container 301 will segment operating systems resources, which may comprise memory, storage, processing, etc.

Inflating new or configuring existing containers 301 may be adapted to vehicle hardware, vehicle software, vehicle operating region and vehicle product class. Different vehicles 100 may have different network architectures, e.g. different IP and VLAN. The container 301 may therefore need to be configured to support that particular vehicle 100. There may be a dynamic component where the precise configuration of the container 301 may also be dependent upon the other already configured containers, and of course the service it shall support.

There may be one or more logical networks, existing or currently configured, that support the service and the one or more containers 301. Containers 301 may connect to or form part of the logical network. The logical network may be configured separately from the container inflation, at the same time instances or at different time instances.

When the vehicle 100 has the required networking capabilities for supporting the service, then step 401 is not necessarily performed.

The vehicle system 105 may obtain information indicating that the reconfiguration has been successfully performed. The information may be obtained from the vehicle 100, from the vehicle database 103 or from some other unit. When the reconfiguration has been successfully performed, the vehicle 100 is capable of hosting the requested service.

The vehicle system 105 may obtain information indicating the state of one or more containers supporting the service after successful reconfiguration of the vehicle 100.

Step 402

This step corresponds to step 204 in FIG. 2. The vehicle system 105 may trigger the service to be provisioned on-board the vehicle 100.

The triggering of the service to be provisioned on-board the vehicle may be performed:

When the result of the comparing indicates that the current configuration of the network capabilities is the same or substantially the same as the required configuration of the network capabilities, or after the reconfiguration has been performed.

The triggering may comprise that the vehicle system 105 sends instructions to the vehicle 100 to install the service, e.g. in the form of an application or other software. The triggering may comprise that the vehicle system 105 sends instructions to the vehicle database 103 which, as a result of the instructions, sends the required data to the vehicle 100 to be able to install the service.

As a result of step 402, the vehicle 100 is provisioned with the service. Communication with the provisioned service may be based on one or more containers 301 supporting the service. Using other words, the one or more containers supporting the service are used for the communication with the provisioned service. With the containers, the communication with the provisioned service may be isolated from at least one other form of communication by the vehicle. The container implements only those interfaces required by the service running in the container rather than running the entire operating system. With this, the risk for conflict between the service and other parts of the vehicle's operating system may be reduced. Also, the quality and speed of the service may be improved with the user of the container(s).

The vehicle system 105 may obtain information indicating that the services has been successfully provisioned on-board the vehicle 100. The information may be obtained for example from the vehicle 100, from the vehicle database 103 or from some other unit.

The method described above will now be described seen from the perspective of the vehicle system 105. FIG. 5 is a flow chart illustrating a method performed by the vehicle system 105 for handling configuration of the vehicle 100. The vehicle system 105 may be partly or completely located offboard the vehicle 100. For example, a first part of the vehicle system may be comprised offboard the vehicle 100 and a second part of the vehicle system may be comprised onboard the vehicle 100, or the vehicle system may be completely located offboard the vehicle 100. The vehicle system 105 may be partly or completely located on-board the vehicle. For example, a first part of the vehicle system may be comprised on-board the vehicle 100 and a second part of the vehicle system may be comprised offboard the vehicle 100, or the vehicle system may be completely located onboard the vehicle 100. The method comprises at least one of the following steps, which steps may be performed in any suitable order than described below:

Step 500

This step corresponds to step 204 in FIG. 2. The vehicle system 105 inflates one or more containers 301. A container 301 is a logical structure representing a segmented part of the vehicle's 100 operating system resources and that are separated from other operating system resources of the vehicle 100. The container 301 may be adapted to the required networking capabilities. The operating system resources may be assigned to a requested new service to be provisioned on the vehicle 100.

Step 501 may be triggered by that the vehicle 100 needs to reconfigure its configuration of network capabilities in order to be capable of hosting a service, for example a newly requested service such as in step 400 in FIG. 4. Step 501 may be triggered by an offboard system sending a control message to the vehicle 100 for example to tell the vehicle 100 what containers 301 it needs, what logical networks should be connected to those containers, which apps should be allowed to talk to those containers 301, etc.

The segmented part of the vehicle's 100 operating system resources that the container 301 represents may be assigned to a service on-board the vehicle 100.

Inflating the one or more containers 301 may be adapted to vehicle hardware, vehicle software, vehicle operating region and vehicle product class.

The container 301 may be associated with communication related to a service on-board the vehicle 100.

The container 301 may be implemented using Linux namespaces.

Inflating a container may be described as using for example Linux namespaces to create the container, configuring the applications to run in the container, the file system, the network interfaces, etc.

The number of containers to inflate may be known from a requested service that the container will support. There may be a static and predefined list of possible configurations and the vehicle 100 assumes one of them based on the requested configuration. When services A B and C are requested, then configuration D may be needed.

Step 501

This step corresponds to step 204 in FIG. 2. The vehicle system 105 initiates configuration of one or more ECUs 108 comprised in the vehicle 100 to connect the one or more containers 301. The number of ECUs to configure may be known from a requested service that the container will support. As a result of the initiating, the one or more ECUs 108 is configured to connect the one or more containers 301 and thereby the service is enabled in the vehicle 100.

The initiating of the configuration of one or more ECUs 108 may be done by the vehicle system 105 sends configuration instructions to the one or more ECUs 108. The configuration instructions comprise information indicating that the one or more ECUs 108 should connect to the one or more containers 301 in order to enable the service. The ECUs 108 configures themselves based on the received configuration instructions to connect to the new logical network and utilize the services available on it based upon the received configuration data.

The initiating of the configuration of one or more ECUs 108 may be done by that the vehicle system 105 distributes configuration data to other onboard ECUs 108, i.e. served ECUs 108, implementing applications required for the service, and which will utilize the new logical network. The one or more ECUs 108 will utilize the new logical network.

Served ECUs 108, receiving configuration data configuring themselves to connect to the new logical network and utilize the services available on it based upon the received configuration data. The ECUs 108 may receive the configuration data for example via an onboard communications gateway comprised in the vehicle 100.

Step 502

This step corresponds to step 204 in FIG. 2. The vehicle system 105 may initiate configuration of one or more logical networks to support the one or more containers 301. This step may be performed such logical networks do not exist. The logical network may be as exemplified in FIG. 3. The number of logical networks to configure may be predefined. The one or more logical networks may support a service.

Containers 301 may connect to or form part of the logical network. The logical network may be configured separately from the container inflation in step 500, at the same time instances or at different time instances.

The one or more logical networks may support a service on-board the vehicle 100.

The vehicle system 105 for handling configuration of a vehicle 100 is adapted to perform the methods described herein, for example in FIGS. 2, 4 and/or 5.

Figure 5:
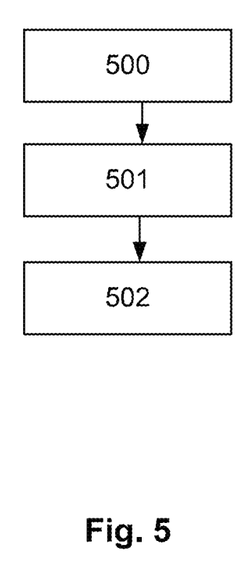
FIG. 5 is a flow chart illustrating a method.
Figure 6A:
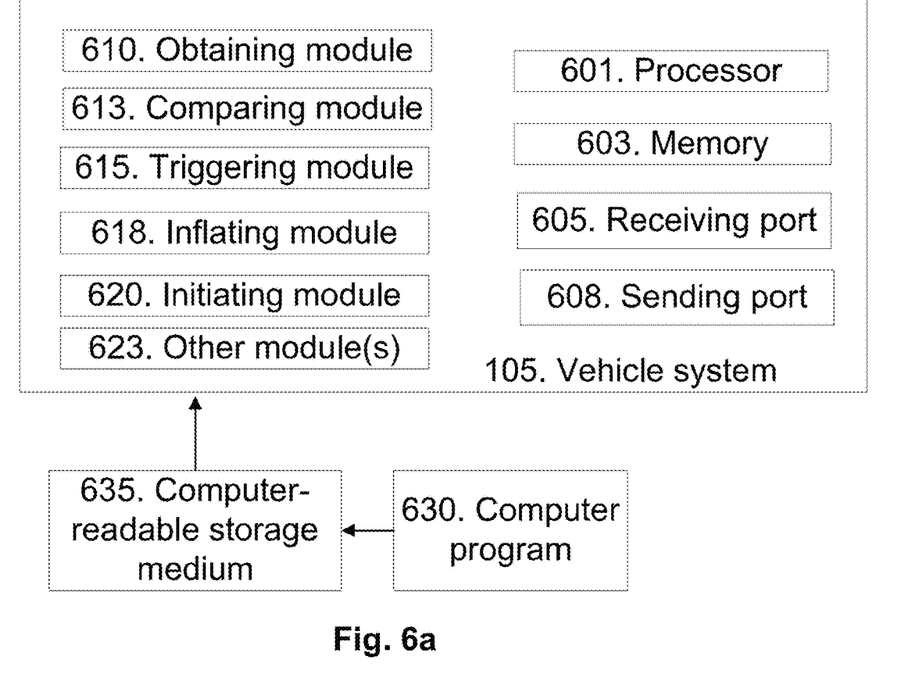
FIG. 6a is a schematic drawing illustrating a vehicle system.
Figure 6B:
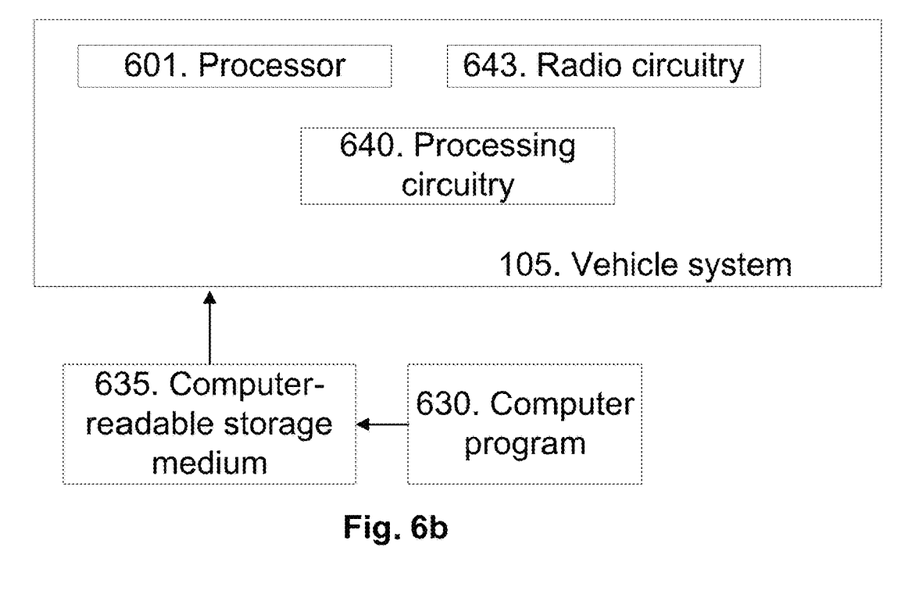
FIG. 6b is a schematic drawing illustrating a vehicle system.

To perform the method steps shown in FIGS. 2, 4 and 5 the vehicle system 105 may comprise an arrangement as shown in FIG. 6a and/or FIG. 6b. The vehicle system 105 may be partly or completely located offboard the vehicle 100. For example, a first part of the vehicle system may be comprised offboard the vehicle 100 and a second part of the vehicle system may be comprised onboard the vehicle 100, or the vehicle system may be completely located offboard the vehicle 100. The vehicle system 105 may be partly or completely located on-board the vehicle. For example, a first part of the vehicle system may be comprised on-board the vehicle 100 and a second part of the vehicle system may be comprised offboard the vehicle 100, or the vehicle system may be completely located onboard the vehicle 100. FIG. 6a and FIG. 6b depict two different examples of the arrangement that the vehicle system 105 may comprise.

The present disclosure related to the vehicle system 105 may be implemented through one or more processors, such as a processor 601 in the vehicle system 105 depicted in FIG. 6a, together with computer program code for performing the functions and actions described herein. A processor, as used herein, may be understood to be a hardware component. The program code mentioned above may also be provided as a computer program product, for instance in the form of a data carrier carrying computer program code for performing the present disclosure when being loaded into the vehicle system 105. One such carrier may be in the form of a CD ROM disc. It is however feasible with other data carriers such as a memory stick. The computer program code may be provided as pure program code on a server and downloaded to the vehicle system 105.

The vehicle system 105 may comprise a memory 603 comprising one or more memory units. The memory 603 is arranged to be used to store obtained information, store data, configurations, schedulings, and applications etc. to perform the methods herein when being executed in the vehicle system 105.

The vehicle system 105 may receive information and/or data from, e.g. the vehicle 100, the vehicle database 103, through a receiving port 605. The receiving port 605 may be, for example, connected to one or more antennas in vehicle system 105. The vehicle system 105 may receive information from another structure in the system through the receiving port 605. Since the receiving port 605 may be in communication with the processor 601, the receiving port 605 may then send the received information to the processor 601. The receiving port 605 may also be configured to receive other information.

The processor 601 in the vehicle system 105 may be configured to transmit or send information to e.g. vehicle 100, the vehicle database 103 or another structure in the system, through a sending port 608, which may be in communication with the processor 601, and the memory 603.

The vehicle system 105 may comprise one or more of: an obtaining module 610, a comparing module 613, a triggering module 615, an inflating module 618, an initiating module 620, other module(s) 623 etc.

The vehicle system 105 is arranged to, e.g. by means of the obtaining module 610, obtain a request for a service to be provided on-board the vehicle 100. Communication with the service provisioned on-board the vehicle 100 may be based on the one or more containers 301 supporting the service. Using other words, the one or more containers supporting the service are used for the communication with the provisioned service. With the containers, the communication with the provisioned service may be isolated from at least one other form of communication by the vehicle. The container implements only those interfaces required by the service running in the container rather than running the entire operating system. With this, the risk for conflict between the service and other parts of the vehicle's operating system may be reduced. Also, the quality and speed of the service may be improved with the user of the container (s). The service may require access to internet, to body builder equipment comprised in the vehicle 100 or to a communication infrastructure comprised in the vehicle 100. The obtaining module 610 may also be referred to as an obtaining unit, an obtaining means, an obtaining circuit, means for obtaining etc. The obtaining module 610 may be the processor 610 of the vehicle system 105 or comprised in the processor 610 of the vehicle system 105.

The vehicle system 105 is arranged to, e.g. by means of the comparing module 613, compare a current configuration of the vehicle's network capabilities with a required configuration of network capabilities that the vehicle 100 is required to have to be capable of hosting the requested service. The network capabilities comprise one or more containers 301 and/or one or more logical networks connecting containers 301 to one another and/or to one or more offboard resources. The container 301 is a logical structure representing a segmented part of the vehicle's 100 operating system resources assigned to the service and that are separated from other operating system resources of the vehicle 100. The comparing module 613 may also be referred to as a comparing unit, a comparing means, a comparing circuit, means for comparing etc. The comparing module 613 may be the processor 601 of the vehicle system 105 or comprised in the processor 601 of the vehicle system 105.

The vehicle system 105 is arranged to, e.g. by means of the triggering module 615, trigger, when a result of the comparing indicates that the current configuration of the network capabilities is different than the required configuration of the network capabilities, the vehicle 100 to reconfigure its current configuration of network capabilities such that the vehicle 100 comprises the required configuration of the network capabilities and is thereby capable of hosting the service.

The vehicle system 100 may be arranged to perform the triggering:
when the result of the comparing indicates that the current configuration of the network capabilities is the same or substantially the same as the required configuration of the network capabilities, or
after the reconfiguration has been performed.

The reconfiguration of the current configuration of network capabilities may comprise one or more of:
installing one or more applications supporting the requested service; and/or
granting one or more applications access to required network resources; and/or
inflating one or more new containers 301; and/or
configuring or reconfiguring existing containers 301; and/or
creating one or more new logical networks by logically connecting containers 301 to each other and/or to one or more offboard resources; and/or
activating one or more network interfaces, e.g. VLAN interfaces.

Logically connecting may be described as creating new logical networks at the link level to isolate data flows from others already on the vehicle 100.

The triggering module 615 may also be referred to as a triggering unit, a triggering means, a triggering circuit, means for triggering etc. The triggering module 615 may be the processor 601 of the vehicle system 105 or comprised in the processor 601 of the vehicle system 105.

The vehicle system 105 may be arranged to, e.g. by means of the triggering module 615, trigger he service to be provisioned on-board the vehicle 100.

The vehicle system 105 may be arranged to, e.g. by means of the comparing module 613, compare a state of one or more current containers 301 that are currently present on the vehicle 100 with a state of one or more required containers 301 that are required to be present on the vehicle 100 to be capable of hosting the requested service.

The vehicle system 105 is arranged to, e.g. by means of the inflating module 618, inflate one or more containers 301. A container 301 is a logical structure representing a segmented part of the vehicle's 100 operating system resources and that are separated from other operating system resources of the vehicle 100. The segmented part of the vehicle's 100 operating system resources that the container 301 represents may be assigned to a service on-board the vehicle 100. The inflating the one or more containers 301 may be adapted to vehicle hardware, vehicle software, vehicle operating region and vehicle product class. The container 301 may be associated with communication related to a service on-board the vehicle 100. The container 301 may be implemented using Linux namespaces. The inflating module 618 may also be referred to as an inflating unit, an inflating means, an inflating circuit, means for inflating etc. The inflating module 618 may be the processor 601 of the vehicle system 105 or comprised in the processor 601 of the vehicle system 105.

The vehicle system 105 is arranged to, e.g. by means of the initiating module 620, initiate configuration of one or more ECU 108 comprised in the vehicle 100 to connect the one or more containers 301. The initiating module 620 may also be referred to as an initiating unit, an initiating means, an initiating circuit, means for initiating etc. The initiating module 620 may be the processor 601 of the vehicle system 105 or comprised in the processor 601 of the vehicle system 105.

The vehicle system 105 is arranged to, e.g. by means of the initiating module 620, initiate configuration of one or more logical networks to support the one or more containers 301. The one or more logical networks may support a service on-board the vehicle 100.

Those skilled in the art will also appreciate that the obtaining module 610, a comparing module 613, a triggering module 615, an inflating module 618, an initiating module 620, other module(s) 623 etc. described above may refer to a combination of analogue and digital circuits, and/or one or more processors configured with software and/or firmware, e.g., stored in memory, that, when executed by the one or more processors such as the processor 601, perform as described above. One or more of these processors, as well as the other digital hardware, may be comprised in a single Application-Specific Integrated Circuit (ASIC), or several processors and various digital hardware may be distributed among several separate components, whether individually packaged or assembled into a System-on-a-Chip (SoC).

The different units 610-623 described above may be implemented as one or more applications running on one or more processors such as the processor 601.

Thus, the methods described herein for the vehicle system 105 may be respectively implemented by means of a computer program 630 product, comprising instructions, i.e., software code portions, which, when executed on at least one processor 601, cause the at least one processor 601 to carry out the actions described herein, as performed by the vehicle system 105. The computer program 630 product may be stored on a computer-readable storage medium 635. The computer-readable storage medium 635, having stored thereon the computer program 630, may comprise instructions which, when executed on at least one processor 601, cause the at least one processor 601 to carry out the actions described herein, as performed by the vehicle system 105. The computer-readable storage medium 635 may be a non-transitory computer-readable storage medium, such as a CD ROM disc, or a memory stick. The computer program 630 product may be stored on a carrier containing the computer program 630 just described, wherein the carrier is one of an electronic signal, optical signal, radio signal, or the first computer-readable storage medium 635, as described above.

The vehicle system 105 may comprise a communication interface configured to facilitate communications between the vehicle system 105 and other units, systems or devices, e.g., the vehicle database 103, the vehicle 100, or another structure. The interface may comprise a transceiver configured to transmit and receive radio signals over an air interface in accordance with a suitable standard.

The vehicle system 105 may comprise the following arrangement depicted in FIG. 6b. The vehicle system 105 may comprise a processing circuitry 640, e.g., one or more processors such as the processor 601, in the vehicle system 105 and the memory 603. The vehicle system 105 may also comprise a radio circuitry 643, which may comprise e.g., the receiving port 605 and the sending port 608. The processing circuitry 640 may be configured to, or operable to, perform the method actions according to FIGS. 2, 4 and/or 5, in a similar manner as that described in relation to FIG. 6a. The radio circuitry 643 may be configured to set up and maintain at least a wireless connection with the vehicle system 105. Circuitry may be understood herein as a hardware component.

Hence, the present disclosure also relates to the vehicle system 105 arranged to handling configuration of a vehicle 100. The vehicle system 105 may comprise the processing circuitry 640 and the memory 603. The memory 603 comprises instructions executable by said processing circuitry 640. The vehicle system 105 is operative to perform the actions described herein in relation to the vehicle system 105, e.g., in FIGS. 2, 4 and/or 5.

The vehicle 100 comprises at least part of the vehicle system described herein.

A computer program comprises program code means for performing the methods described herein when said program is run on a computer. A computer readable medium carrying a computer program comprises program code means for performing the method described herein when said program product is run on a computer.

The present mechanism for handling configuration of a vehicle 100 may be implemented through one or more processors together with computer program code for performing the functions of the embodiments herein. The processor may be for example a Digital Signal Processor (DSP), Application Specific Integrated Circuit (ASIC) processor, Field-programmable gate array (FPGA) processor or microprocessor. The program code mentioned above may also be provided as a computer program product, for instance in the form of a data carrier carrying computer program code for performing the embodiments herein when being loaded into the vehicle system 105. One such carrier may be in the form of a CD ROM disc. It is however feasible with other data carriers such as a memory stick. The computer program code can furthermore be provided as pure program code on a server and downloaded to the vehicle system 105.

Summarized, a customer requests a service from the vehicle system 105, for example via a portal. The vehicle system 105 will ensure that the vehicle 100 is capable of hosting the service, and when it is capable, compares the current configuration of the network capabilities of the vehicle 100 to that required to host the service. The configuration of the network capabilities may comprise a state of one or more containers supporting the service, i.e. the containers present on the vehicle 100. The state may indicate whether the necessary containers exist, whether they are configured properly, etc. Based on the response from the vehicle configuration database 103, the vehicle system 105, for example via a portal backend, will then request the vehicle 100 to configure itself appropriately based on the difference between the required configuration of the network capabilities and the current configuration of the network capabilities. This may comprise installing required applications, granting them access to required resources, inflating new containers, configuring existing containers, logically connecting containers, etc. Once the vehicle 100 has configured itself it may report this state to the portal backend.

The service may not only require internet access, but it may also be granted access to body builder equipment or other communication infrastructure on the vehicle 100, such as a wireless interface, satellite communication equipment, etc.

The vehicle system 105 may be arranged to, upon receiving a request from a remote service management portal to provision a new service on the vehicle 100, determine a set of required networking capabilities by the vehicle 100 to support the new service, inflate one or more containers 301, where a container 301 is a logical structure configured to isolate operating system resources related to the new service from at least one other form of operating system resources by the vehicle 100, and configure one or more served ECUs 108 on the vehicle 100 to connect to the one or more containers 301 in order to enable the new service.

Containers 301 are inflated which provides a logical structure configured to isolate operating system resources related to the requested service from at least one other operating system resources of the vehicle 100. The present invention relates to networking capabilities or network segmentations of containers 301 at a logical link layer in relation to external operating system resources.

With the containerization disclosed herein, it is possible to configure the vehicle 100 in a dynamic way, based upon requested services. With the use of containers 301, it allows for conflicting IP routing or forwarding tables and ensures that communications are segregated and segmented at the logical link level for quality, safety and security. Furthermore, the present disclosure support services delivered by applications which may not be designed specifically to run on automotive ECUs 108, and thus demand more traditional internet connectivity as one would expect from a consumer mobile device.

For example, an application for a service designed for an Android phone is expected to be able to make a request towards the Android framework for a socket towards a web server. The Android framework expects there to be a network access device, e.g. a cellular modem, directly accessible to it which provides this internet access. The Android framework was/is not really designed to have a distributed architecture where the onboard gateway is a remote ECU 108 that is Ethernet accessible, nor was it designed to deal with the fact there may be segments of a network accessible by the framework which only certain applications should get access to, even when they only have user level privileges on the system. This gap is bridged by the present invention by causing the vehicle 100 to configure itself in such a way so that the application can make a simple socket request and does not have to do anything else. The complexity is hidden from the vehicle 100.

The term "at least one of A and B" should be understood to mean "only A, only B, or both A and B.", where A and B are any parameter, number, indication used herein etc.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

It is to be understood that the present invention is not limited to the embodiments described above and illustrated in the drawings; rather, the skilled person will recognize that many changes and modifications may be made within the scope of the appended claims.

The invention claimed is:

1. A method performed by a vehicle system for handling configuration of a vehicle, the method comprising:
obtaining a request for a service to be provided on-board the vehicle;
comparing a current configuration of the vehicle's network capabilities with a required configuration of network capabilities that the vehicle is required to have to be capable of hosting the requested service, wherein the network capabilities comprise one or more containers and/or one or more logical networks connecting containers to one another and/or to one or more offboard resources, and wherein each container of the one or more containers is a logical structure representing a segmented part of the vehicle's operating system resources assigned to the requested service and that are separated from other operating system resources of the vehicle; and when a result of the comparing indicates that the current configuration of the vehicle's network capabilities is different than the required configuration of the network capabilities that the vehicle is required to have to be capable of hosting the requested service, triggering the vehicle to reconfigure the current configuration of the vehicle's network capabilities such that the vehicle comprises the required configuration of the network capabilities that the vehicle is required to have to be capable of hosting the requested service and is thereby capable of hosting the requested service.

2. The method according to claim 1, comprising:
triggering the requested service to be provisioned on-board the vehicle.

3. The method according to claim 2, wherein the triggering the requested service to be provisioned on-board the vehicle is performed:
when the result of the comparing indicates that the current configuration of the vehicle's network capabilities is the same or substantially the same as the required configuration of the network capabilities that the vehicle is required to have to be capable of hosting the requested service, or
after the reconfiguration of the current configuration of the vehicle's network capabilities has been performed.

4. The method according to claim 1, wherein the reconfiguration of the current configuration of the vehicle's network capabilities comprises one or more of:
installing one or more applications supporting the requested service; and/or
granting one or more applications access to required network resources; and/or
inflating one or more new containers; and/or
configuring or reconfiguring existing containers; and/or
creating one or more new logical networks by logically connecting containers to each other and/or to one or more offboard resources; and/or
activating one or more network interfaces.

5. The method according to claim 1, wherein the comparing the current configuration of the vehicle's network capabilities with the required configuration of network capabilities that the vehicle is required to have to be capable of hosting the requested service comprises:
comparing a state of one or more current containers that are currently present on the vehicle with a state of one or more required containers that are required to be present on the vehicle to be capable of hosting the requested service.

6. The method according to claim 1, wherein communication with the requested service provisioned on-board the vehicle is based on the one or more containers supporting the requested service.

7. The method according to claim 1, wherein the requested service requires access to internet, to body builder equipment comprised in the vehicle, or to a communication infrastructure comprised in the vehicle.

8. The method according to claim 1, wherein the vehicle system is partly or completely located offboard the vehicle, or wherein the vehicle system is partly or completely located on-board the vehicle.

9. A vehicle comprising at least a part of a vehicle system for handling configuration of the vehicle, the vehicle system comprising a processor and a memory being adapted to perform the method of claim 1.

10. A non-transitory computer-readable storage medium storing a computer program comprising program code for performing the method of claim 1 when the program code is executed on a computer.

* * * * *